(No Model.) 3 Sheets—Sheet 1.
J. E. JONES.
SAFETY BUFFER CAR FENDER.
No. 601,441. Patented Mar. 29, 1898.
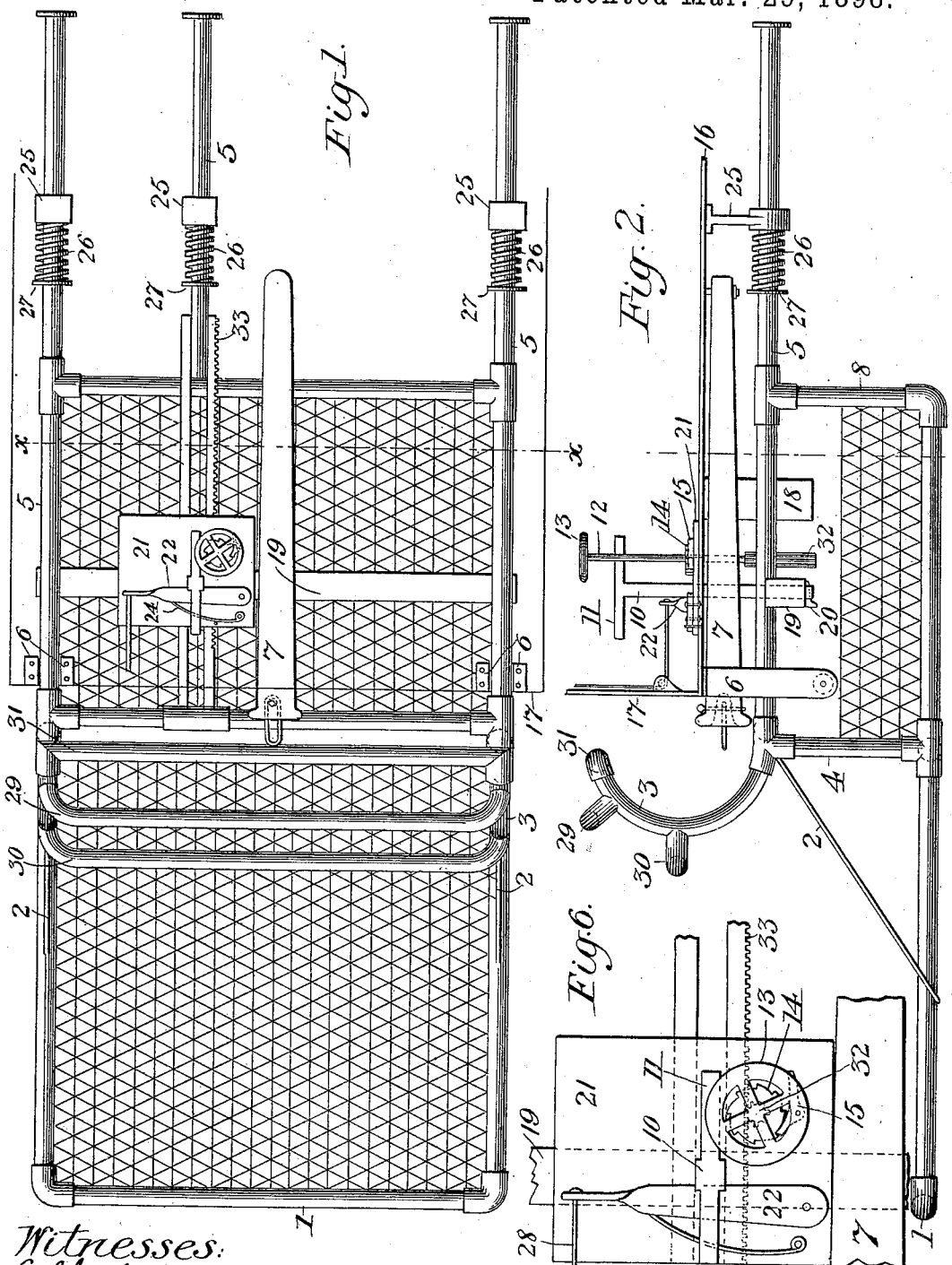
Witnesses:
E. Sheffield
Philip J. Nash
Inventor
John Edward Jones
by Francis King, attorney

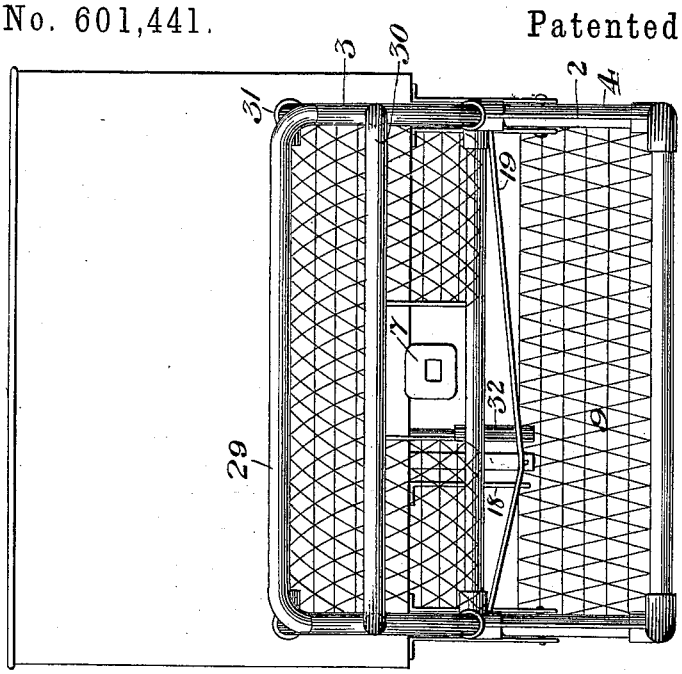
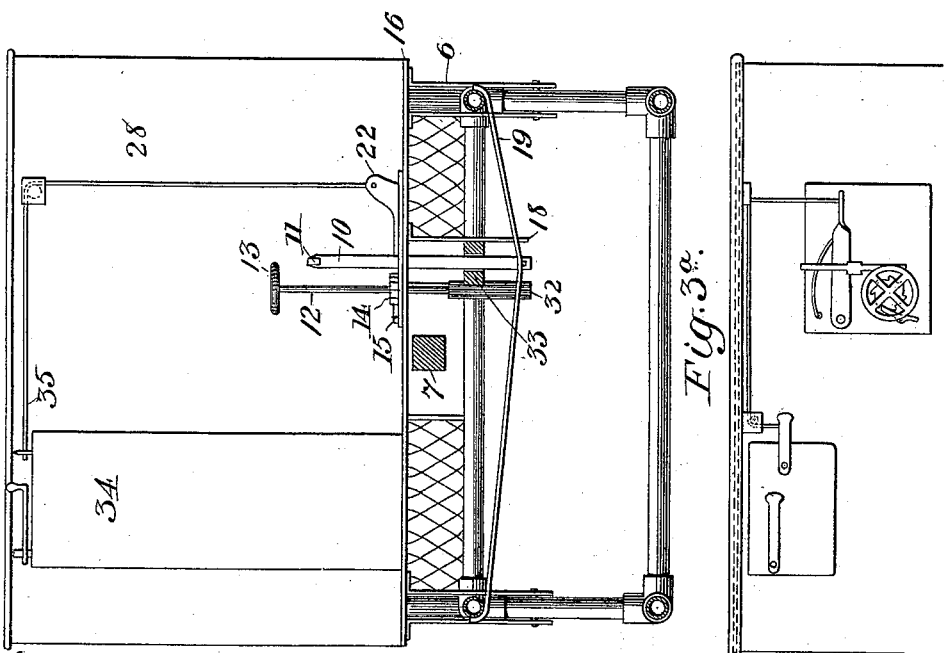

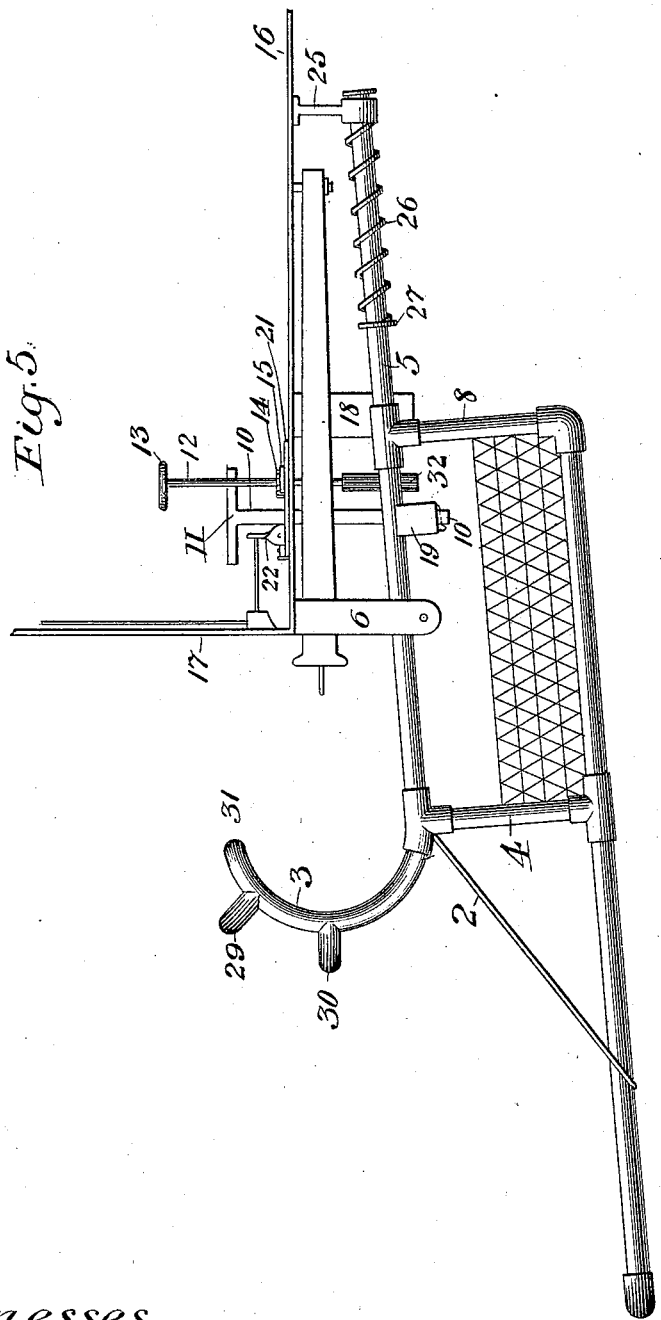

UNITED STATES PATENT OFFICE.

JOHN EDWARD JONES, OF KINGSTON, CANADA, ASSIGNOR OF ONE-HALF TO HOWARD S. FOLGER, OF SAME PLACE.

SAFETY-BUFFER CAR-FENDER.

SPECIFICATION forming part of Letters Patent No. 601,441, dated March 29, 1898.

Application filed March 22, 1897. Serial No. 628,672. (No model.)

*To all whom it may concern:*

Be it known that I, JOHN EDWARD JONES, a British subject, residing at Kingston, in the Province of Ontario and Dominion of Canada, have invented a new and useful Safety-Buffer Car-Fender, of which the following is a specification.

My invention is a car-fender so shaped and mechanically arranged that the following objects are attained: First, a person or any obstacle picked up is absolutely protected from contact with the coupling-iron and all other parts of the car or truck; second, the distance that the fender is to project in front of the car may be regulated at will from the car-platform; third, the fender may be raised well above the ground or instantaneously lowered to any required distance above the rail-heads, and, fourth, when a person or any obstacle is struck the shock is taken up by springs and the force of the blow thereby greatly lessened. I attain these objects by the mechanism illustrated in the accompanying drawings, in which—

Figure 1 is a plan of the fender; Fig. 2, a side elevation; Fig. 3, a sectional elevation showing that part of the fender to the left of the line $x$ $x$ drawn across Figs. 1 and 2; Fig. 3$^a$, a top view of part of the car-platform and a motorman's resistance-box; Fig. 4, an elevation of the front of the fender; Fig. 5, a side elevation showing the fender dropped down to its lowest position; and Fig. 6, a plan of part of Fig. 1, showing mechanical arrangements.

Similar figures refer to similar parts throughout the several drawings.

A clear conception of the design of the fender can best be gained by reference to Figs. 1 and 2, showing a plan and a side elevation. In the plan the floor of the fender is shown formed of wire-netting stretched across a framework which may best be made of iron piping. Screens of wire-netting (shown in Fig. 2) form side walls at the rear part of the fender, and another screen (shown as 9 in Fig. 4) forms a third wall across the rear end. These screens effectually prevent any contact with the wheels or truck in the event of a person being caught in the fender.

1 is the front bar of the fender and may be thickly cushioned with rubber or other material, as required.

2 2 are wire cords covered with rubber, supporting the side frame-bars of the floor of the fender and attached to the upper buffer part 3, which curves upward and back in front of the car-platform to its top frame-bar 31, a continuation of 5, hereinafter referred to. This curved part is also formed of wire-netting stretched on a frame and is further cushioned by means of one or more flexible bars 29 30, held in front of it and made of coiled steel spring, covered with rubber tubing, which, besides forming an additional buffer, will serve as rails, which a person may seize with the hand for support when caught in the fender. An opening in the center of the curved surface of 3, as shown in Fig. 4, allows the car-coupler 7 to be used, if necessary.

4 and 8 are verticals suspending the bottom frame of the fender from the upper frame-bars 5 5. These bars move in guiding-loops 6 6, which are closed at their lower ends by small wheels, upon which the bars 5 5 will roll when moved back or forward beneath the car. The rear ends of the side and center frame-bars 5 5 5 are supported in brackets 25 25 25.

10 is a bar projecting up through the car-platform 16, surmounted by a handle 11 and supporting by a key 20 a bar 19, Fig. 3, by means of which the fender is raised when required. A catch 22 on the car-platform, pressed by a spring 24, is forced into a slot 23 in the bar 10 when the fender is raised and holds the fender in the position shown in Fig. 2. A blow with the foot on the free end of the catch 22 will release it and cause the fender to drop, as in Fig. 5.

12 is a pinion bearing a cogged wheel 32, which works in a ratchet 33, attached to the center upper frame-bar 5. By means of a small hand-wheel 13 on the top of 12 the fender may be drawn back as near the car as required. A ratchet-wheel 14, attached to 12 and controlled by a catch 15, serves to retain the fender in any position to which it is drawn back.

26 26 26 are springs which give the fender its forward motion. They may be stiffened by means of keys 27 27 27.

18 is a guide for the central upper frame-bar 5 and is attached to the car-platform.

21 is a plate on the car-platform, to which 15, 22, and 24 are attached.

A wire or cord 28, carried through pulleys on the dashboard of the car, may be used to connect the catch 22 with the reversing-handle of the motorman's resistance-box, being attached to the said handle at or near its free end, so that in cases of emergency when the handle is turned the end of the wire will travel with it, the pull thus exerted upon the wire being sufficient to release the catch 22 from the slot in the bar 10, thereby causing the fender to drop into working position.

It is intended that the fender should be kept in its extended position when possible. It may be drawn in for convenience close to the car at any time, and if in that position may be instantaneously released by freeing the catch 15. When it is extended, the shock of collision with any obstacle is taken up by the springs 26 26 26 until the fender is pressed right back against the car, and the force and danger of the collision are thus greatly lessened.

The fender may usually be carried so that the front bar is quite close to the ground. In passing over rough roads or if for any other reason it is necessary the fender may be raised and automatically retained in its elevated position, to be again lowered at a moment's notice, either by means of the catch 22 directly or by means of the reversing-handle of the box governing the electric current.

The upright curved part of the fender 3 in the drawings will greatly lessen the danger to human life by preventing any collision with the front of the car and affording a means of support to any person thrown against it.

The fenders being movable on every car, as shown, they may be overlapped when cars are stored in the sheds.

I am aware that prior to my invention car-fenders have been made in many styles, and I do not claim the general idea of a fender as original.

What I do claim as my invention, and desire to secure by Letters Patent, is—

1. The combination, in a car-fender, with a rigid frame, capable of a horizontal backward and forward motion and of a separate vertical motion all controllable by the operator, of a practically horizontal floor or bed of netting projecting forward, screens of netting forming walls at the rear sides and rear thereof, and an upright curved buffer or shield of netting rising in front of the car-platform, said buffer bearing flexible cushions in the shape of cross-bars made of coiled steel spring, covered with rubber tubing attached thereto, and having an aperture therein to allow car-coupling said parts of netting being permanently stretched upon said frame, and all substantially as and for the purposes set forth.

2. The combination, in a car-fender, with a rigid frame, practically horizontal floor of netting, side and rear walls of netting, and a rigid upright curved cushioned buffer covering the car-platform, of brackets and loops attached to the bottom of the car wherein the upper frame-bars of the fender travel, coiled springs upon said frame-bars to give forward motion to the whole frame, a ratchet attached to one bar, a cogged wheel upon an upright rotatable shaft engaging said ratchet, and a handle a ratchet-wheel and a catch governing the rotation of said shaft and adapted to allow the operator to retract the whole frame bodily, all substantially as and for the purposes set forth.

3. The combination, in a car-fender, with rigid frame, practically horizontal floor, and side and rear walls of netting, and upright curved cushioned buffer, of loops and brackets attached to the bottom of the car to guide the frame-bars, a bar and handle adapted to raise the whole frame vertically and a spring and catch on the car-platform to retain it automatically in its elevated position or to release it, all substantially as and for the purposes set forth.

4. The combination, in a car-fender with rigid frame, practically horizontal floor, and side and rear walls of netting, and upright curved cushioned buffer, of loops and brackets on the bottom of the car to guide the frame-bars, coiled springs on the bars to project the whole frame forward bodily, a ratchet and cogged wheel and handle to retract it, retaining devices, a bar and handle adapted to raise the whole frame vertically, and a spring and catch to retain it automatically in its elevated position or to release it, substantially as and for the purposes set forth.

5. The combination, in a car-fender, with rigid frame, practically horizontal floor, and side and rear walls of netting, and upright curved cushioned buffer, of loops and brackets on the bottom of the car to guide the frame-bars, coiled springs on the bars to project the whole frame forward bodily, a ratchet, cogged wheel and handle to retract it, retaining devices, a bar and handle adapted to raise the whole frame vertically, a spring and catch to retain it automatically in its elevated position or to release it, and a detachable wire connection between said catch and the reversing-handle of the box governing the electric current, whereby the turning of said handle will allow the frame to fall, all substantially as and for the purposes set forth.

6. The combination, in a car-fender, with projecting horizontal floor, screen-walls and upright cushioned buffer, of a rigid frame whereon the netting parts are stretched, guiding loops and brackets attached to the bottom of the car, devices for retracting and raising the said frame bodily, controllable from the car-platform, and coiled springs upon the frame-bars of the fender giving them forward pressure, adapted when the frame is projected forward and whether raised or lowered, to take up the shock of a collision by receiving the frame until said springs are completely compressed, and that without any consequent change in the shape of the fender or loss of its effectiveness, all as and for the purposes substantially as set forth.

JOHN EDWARD JONES.

In presence of—
 ANNIE J. TRACY,
 F. W. WAKEFORD.